April 23, 1929.                H. M. LEONARD                    1,710,365
                             FUEL FEEDING MEANS
                             Filed June 29, 1927
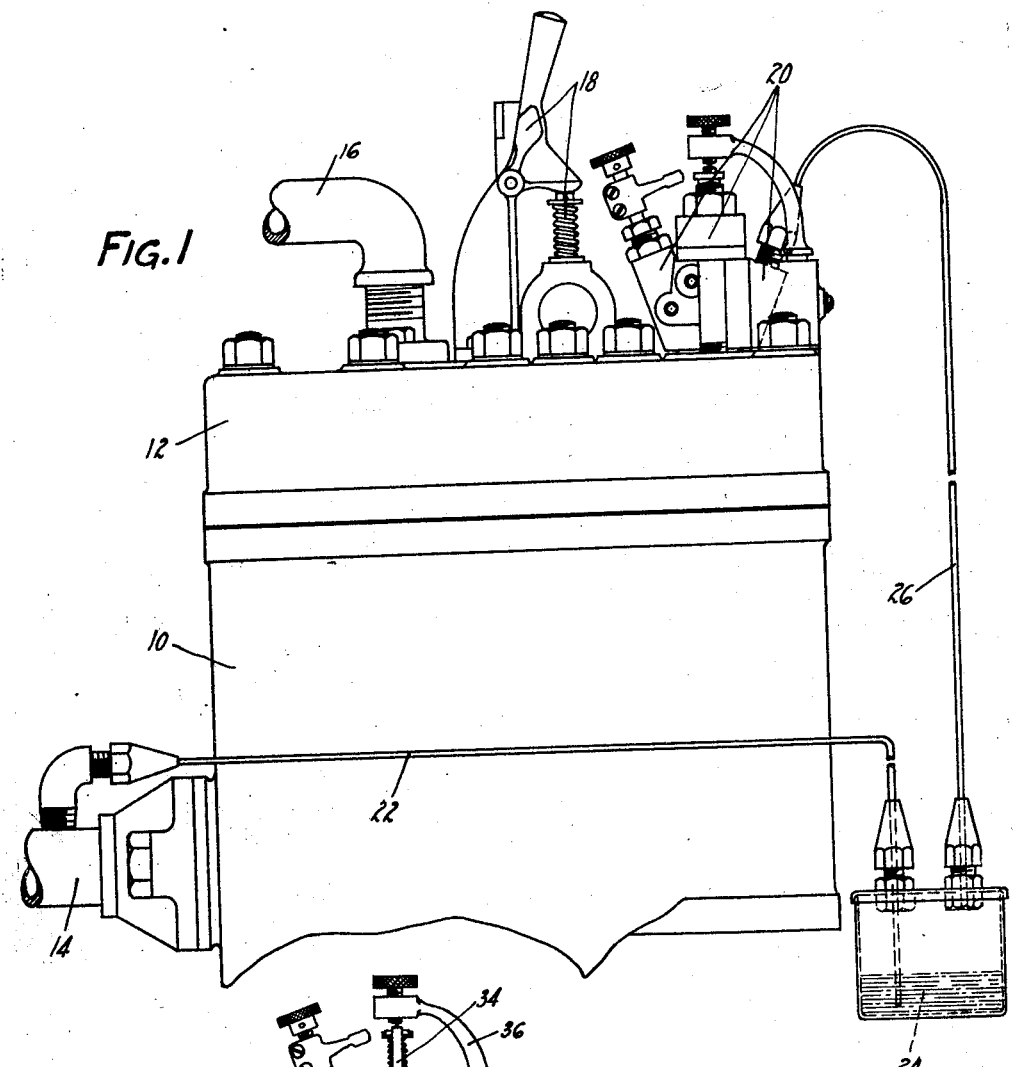
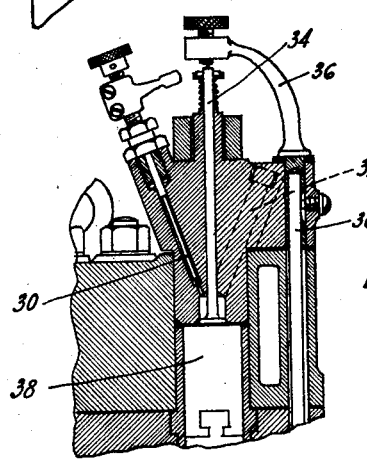
INVENTOR
HOWARD M. LEONARD
BY
*M. W. McConkey*
ATTORNEY Patented Apr. 23, 1929.

1,710,365

UNITED STATES PATENT OFFICE.

HOWARD M. LEONARD, OF SOUTH BEND, INDIANA, ASSIGNOR TO GERNANDT MOTOR CORPORATION, OF CHICAGO, ILLINOIS, A CORPORATION OF ILLINOIS.

FUEL-FEEDING MEANS.

Application filed June 29, 1927. Serial No. 202,264.

This invention relates to engines of the injection or Diesel type, and is illustrated as embodied in novel means for supplying exhaust engine gases for preliminary vaporization of the fuel charges. According to an important feature of the invention, these gases are cleaned, and preferably also cooled, before being mixed with the fuel, for example by being washed with water through which they are passed. This not only causes more efficient preparation of the fuel, but also prevents particles of solid matter or tarry materials in the exhaust from clogging the fuel-injecting mechanism.

Another feature of novelty relates to the construction and arrangement of the parts of the fuel-injecting means proper.

The above and other objects and features of the invention will be apparent from the following description of one illustrative embodiment shown in the accompanying drawing, in which:

Figure 1 is a side elevation of an engine, showing the cleaning and cooling device and its connections; and Figure 2 is a section through the fuel-injecting means.

The illustrated engine is of the Diesel or injection type, and is shown as including a cylinder block 10 and a detachable cylinder head 12, together with an exhaust manifold or conduit 14. One of the water jacket connections is shown at 16 and a compression-relief device at 18. The fuel-injecting means 20 may be substantially as shown in detail in Figure 2, although the invention in this phase is applicable to any fuel-injecting device in which each fuel charge is vaporized in a charge of exhaust engine gas before injection.

According to this phase of the present invention, then, the exhaust engine gases in which the fuel is to be vaporized, and which may be led from the exhaust manifold 14 through a conduit 22, are cleaned and cooled by being washed by passing through water in a novel device 24, and are then led by a conduit 26 to the fuel-feeding means 20.

The illustrated fuel-injecting means includes a fuel conduit controlled by a needle valve 30, a conduit 32 for the exhaust gases, a valve 34 controlling the outlets of both of the conduits 30 and 32, and which is operated by a cam-controlled thrust rod 36, and a plunger 38 for compressing and injecting into the engine the mixture of fuel and exhaust gas.

While one illustrative embodiment has been described in detail, it is not my intention to limit the scope of the invention to that particular embodiment, or otherwise than by the terms of the appended claims.

I claim:

1. Fuel-feeding means for an internal-combustion engine of the Diesel type including, in combination, fuel-injecting means, a cleaning and washing device, and conduits for leading exhaust engine gases to the cleaning device and thence to the fuel-injecting means.

2. Fuel-feeding means for an internal-combustion engine of the Diesel type including, in combination, fuel-injecting means, a cooling and washing device, and conduits for leading exhaust engine gases to the cooling device and thence to the fuel-injecting means.

3. Fuel-feeding means for an internal-combustion engine of the Diesel type including, in combination, fuel-injecting means, and means for washing exhaust engine gases and supplying them to the fuel-injecting means.

In testimony whereof, I have hereunto signed my name.

HOWARD M. LEONARD.